United States Patent [19]

Harris

[11] 3,968,698

[45] July 13, 1976

[54] AUTOMATIC RESET TIMER

[75] Inventor: John L. Harris, Clearwater, Fla.

[73] Assignee: Deltrol Corporation, Bellwood, Ill.

[22] Filed: Feb. 20, 1973

[21] Appl. No.: 333,767

[52] U.S. Cl. .................................................... 74/3.5

[51] Int. Cl.² ............................................ F16H 5/74

[58] Field of Search .................. 74/3.5, 568 T, 3.52, 74/3.54, 3.5, 126; 200/38, 33

[56] References Cited

UNITED STATES PATENTS

| | | | |
|---|---|---|---|
| 2,548,807 | 4/1951 | Morgan et al. | 74/41 |
| 2,828,636 | 4/1958 | Hall | 74/126 |
| 2,923,165 | 2/1960 | Patzer | 74/126 |
| 2,988,608 | 6/1961 | Everard | 200/33 |
| 3,033,949 | 8/1962 | Hehl | 74/568 T |
| 3,079,812 | 5/1963 | Bross | 74/3.5 |
| 3,156,123 | 11/1964 | Denny | 74/568 T |
| 3,156,125 | 11/1964 | Straub | 74/126 |
| 3,320,822 | 5/1967 | Tatom | 74/126 |
| 3,457,792 | 7/1969 | Fleckenstein | 74/3.52;3.54 |
| 3,465,605 | 9/1969 | Hylan | 74/142 |
| 3,566,051 | 2/1971 | Hulterstrum | 74/568 T |
| 3,581,026 | 11/1968 | Losert | 200/38 R |
| 3,732,738 | 5/1973 | Grout | 200/35 R |
| 3,738,178 | 6/1973 | Marquis | 74/3.5 |
| 3,741,019 | 6/1973 | Weber | 74;200/3.5;38 |

*Primary Examiner*—Samuel Scott
*Assistant Examiner*—Wesley S. Ratliff, Jr.

[57] ABSTRACT

An automatic reset timer includes two separate switches having operators held in timed out position by individual latches. A clutch is released by one operator when the timer is timed out. A solenoid also controls the latches for the two switches and also controls the clutch directly. A clutch mode selector is accessible outside the case and may be set for on delay, off delay, or neutral. In neutral the clutch is not controlled by the solenoid and is released only when the timer is timed out. Other mode selectors outside the enclosure control solenoid operation of the switches. They may be caused to transfer from timed out to timing position by either solenoid energization or deenergization. A third position provides for instantaneous operation of one switch by the solenoid. Selection of clutch and switch modes of operation makes a single unit field adjustable in many different combinations, simplifying application to a given problem and reducing models required to be stocked.

23 Claims, 26 Drawing Figures

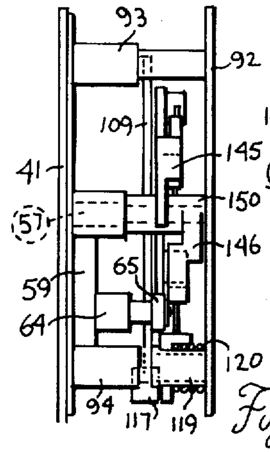
Fig. 15
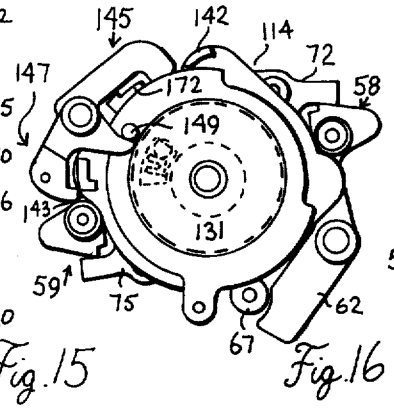
Fig. 16
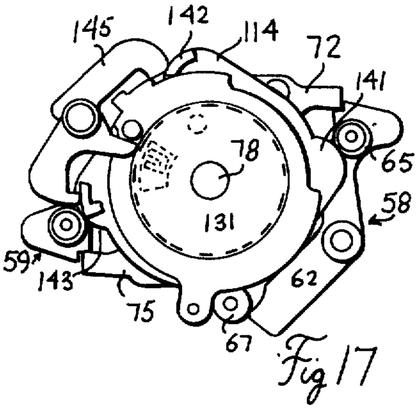
Fig. 17
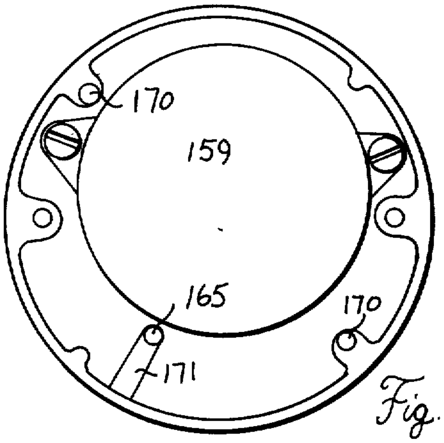
Fig. 18
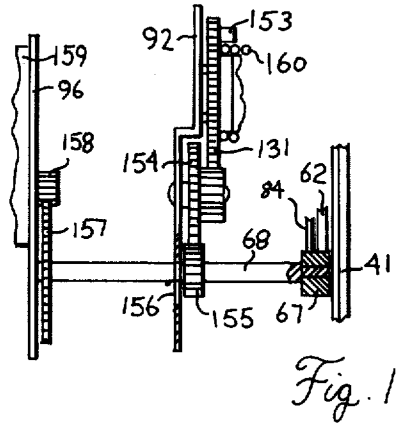
Fig. 19
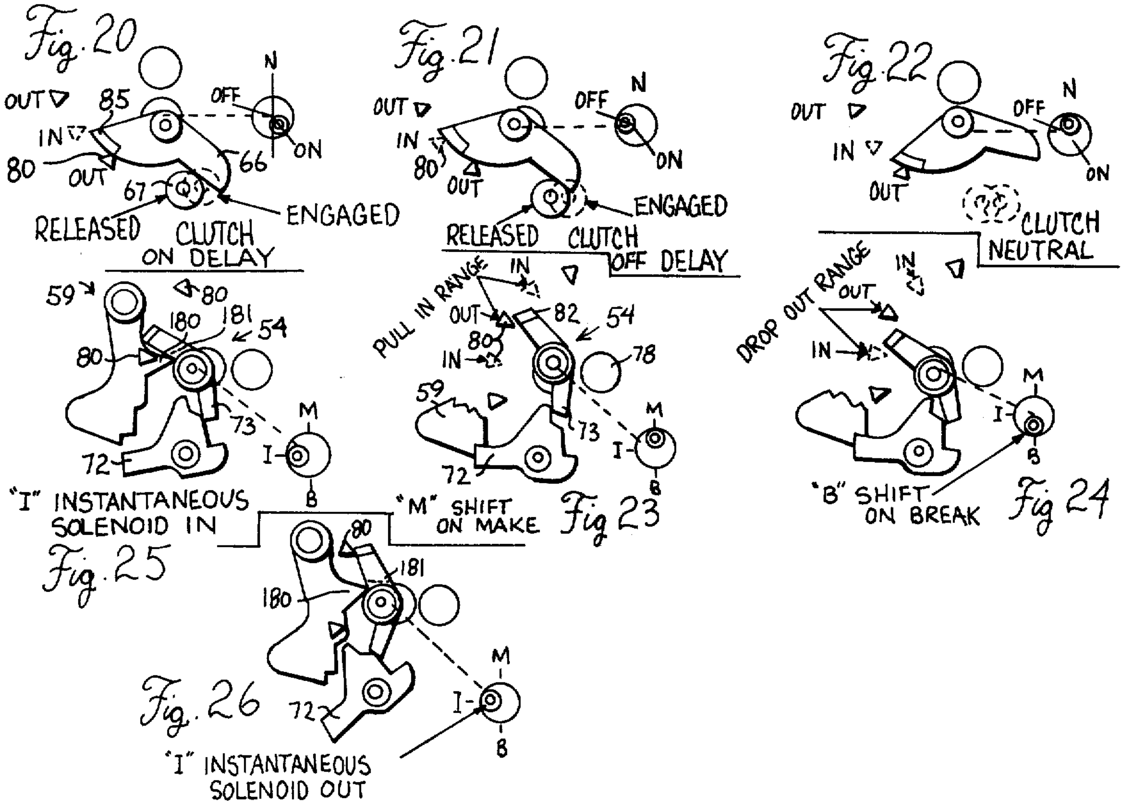

AUTOMATIC RESET TIMER

BACKGROUND OF THE INVENTION

This invention relates to electro-mechanical timing devices and mechanisms and more particularly to timers of the automatic reset type.

In many timing applications it is necessary to start and control the timer from a remote point and also have the time cycle adjustable. This has led to use of motor driven automatic reset timers in which a spring return timing mechanism resets to an adjustable starting position when a clutch is released. To start a timing cycle, the clutch is engaged and the mechanisms drives to a "timed" out position in which one or more switches transfer from "timing" position to "timed out" position.

In some applications it is required to delay operation of the timer switch until the end of the time cycle. This is known as delay timing. In this case the timer switch is returned from timed out to timing position prior to the start of the cycle so that no timer switch operation takes place at the start of the cycle.

In other applications it is necessary to energize a load as the start of the cycle and to deenergize it at the end of the cycle. This is known as interval timing. This type of operation requires more mechanism than simple delay timing, either built into the timer or a relay external to the timer.

In certain applications it is required or permissable for the timer to reset to starting position in response to a power interruption. Here the timer clutch is released in response to deenergization of an electro-magnet. This is known as "on delay".

In other cases it is necessary for the timer to hold its position in case of power failure. In others it is required to reset in response to making of the control circuit. The timer clutch disengages in response to energization of the electromagnet. This is known as "off delay".

The different requirements met in the field in addition to the basic requirements of on delay, off delay, and "interval" are many. In some, the cycle start must be from closure of the control circuit, in others from control circuit opening. In some the control circuit action is only momentary. In others it is sustained. These various requirements have required numerous models of timers and in addition considerable outside circuitry to get the results needed.

In order to reduce models required and also reduce outside circuitry it has been common to build timers with two "delay" switches actuated by the timer and two "instantaneous" switches actuated by the electromagnet. These switches have individual terminals allowing the user to connect them in various manners to obtain different results from the timer. This is expensive. The customer must buy more than he needs. He must spend considerable time cross-wiring the switches. In addition, often half of the switches are used by cycling the timer so that they are not available for controlling external loads.

My U.S. Pat. No. 3,489,015 discloses a reset timer in which the clutch operation and switch operation by the timer solenoid are separated. This construction permits a wide variety of combinations of clutch modes of operation with switch modes of operation. Providing the proper combination for a given application simplifies the timer and reduces or eliminates external auxiliary circuitry. In this arrangement the proper model for the application must be assembled at the factory, using certain different key parts for each model.

BRIEF SUMMARY OF THE INVENTION

The primary object of the invention is the provision of an automatic reset timer which can be quickly converted by the installer to match the requirements of the particular installation.

In the preferred embodiment of the invention, one or more timer switches are mounted in the base or rear of the timer and are directly attached to terminals extending through the base. Terminals for the timer motor and solenoid are also mounted in this rear portion in what may be termed a terminal area generally around a selector area carrying mode selectors, one for each switch and one for the clutch.

The mode selector for the clutch has three positions, on delay, off delay, and neutral. These selectors determine how the timer solenoid controls the clutch. The mode selector for the switch determines how the switch is controlled by the solenoid. The mode selector for the main switch has two positions. In the "M" position, the switch transfers to timing when the control circuit makes. In the "B" position the switch transfers to timing on breaking of the control circuit. If the timer includes a second switch the mode selector for this switch has three positions. In the "I" position the switch transfers instantaneously with making and breaking of the control circuit.

Another object of the invention is to provide an automatic reset timer giving the user a plurality of options of clutch control by the timer solenoid such as on delay, off delay, or netural.

A further object of the invention is the provision of an automatic reset timer giving the user a plurality of options of switch control by the timer solenoid, such as start on make, start on break, or instantaneous.

In the preferred form of the invention the switches and clutch are arranged in different angular locations around a center, and the mode selectors for each are similarly situated. The switch and clutch operators are actuated by abutment means preferably on a wheel rotating about the center. This wheel is actuated by the timer solenoid through a ratchet mechanism, moving one half step (pull-in operating range) when the solenoid pulls in and moving the other half step (drop-out operating range) when the solenoid drops out. The mode selectors shift the switch and clutch operators relative to the two operating ranges and thus determine whether operations takes place on solenoid pull in or drop out.

A further object of the invention is the provision of mode selector mechanism of general application and utilizing an arrangement in which driving mechanism is moved selectively through first and second operating ranges and in which driven mechanism is shiftable between these operating ranges.

In the preferred form of the invention the operators for the switches and clutch are levers bodily carried by pins mounted eccentrically on mode selectors which are rotatable. Rotating the selector bodily shifts the lever causing the change in action.

Another object of the invention is the provision of a mode selector mechanism including a lever and in which part or all of the lever is bodily shifted to affect the mode selection.

The invention in its preferred form includes a ratchet slide which is moved longitudinally in one direction by a solenoid actuated lever and is moved in the opposite direction by a return spring biased lever operating on a camming surface of the slide. This slide is adjacent the abutment wheel which actuates the switches and clutch and rotates this wheel step by step. The camming surface is characterized to compensate for the spring rate of return spring and the varying work load on the wheel. The point of contact of the slide with the solenoid lever is also a camming surface characterized to compensate for the pull curve on the solenoid and the varying forces encountered by the slide.

A further object of the invention is the provision of a solenoid operated mechanism having camming surfaces, one compensating for spring rate of the return spring and another compensating for the pull curve of the solenoid.

Another feature of the invention is the general arrangement of the switches, timer mechanism, solenoid, motor, and dial assembly. The switches are in the rear or base section and are directly supported by the terminals, eliminating wiring. The timing and switch controlling mechanism is forward of the switch section. The solenoid is forward of this mechanism. The motor is mounted adjacent the dial and is the last thing to go in before the dial assembly is mounted. This provides for quick replacement of the motor without disturbing the main parts of the timer. It also allows the timing range of the timer to be determined at the last stage of assembly as the motor speed and dial must be related.

A further object of the invention is the provision of a timer in which the clutch is released whenever the timer is in its timed out position. This permits continuous operation of the timer motor, increasing the accuracy of the timer and eliminating the need of one of the switches for controlling the motor. It also eliminates the need for the timer solenoid to control the clutch, making possible the neutral position on the clutch operator.

In the preferred embodiment, the clutch is released by the switch operator in its movement toward latched position when the timer times out. The invention includes means for insuring the latch is in place before full reset of the timing mechanism caused by releasing of the clutch.

Other objects of the invention will appear from the following detailed description and the appended claims.

BRIEF DESCRIPTION OF THE DRAWINGS

FIG. 15 is a side view of FIG. 14;

FIG. 16 is a fragmentary view similar to FIG. 14 but showing the positions assumed by the parts just before the timed-out snap action point;

FIG. 17 is a view similar to FIG. 16 but showing the completion of the timed-out snap action;

FIG. 18 is a sectional view taken on line 18—18 of FIG. 6;

FIG. 19 is a fragmentary view showing the drive gearing and clutch for the timer mechanism;

FIG. 20 is a schematic showing of the clutch operation when the clutch mode selector is set for on delay;

FIG. 21 shows the clutch operation with the mode selector set for off delay;

FIG. 22 shows the action when the clutch mode selector is set for "neutral";

FIG. 23 is a schematic indication of the latch operation by the solenoid when the switch mode selector is set for "shift on make";

FIG. 24 is a schematic indication of the operation when the switch mode selector is set for "shift on break";

FIG. 25 shows the positions of the switch operating mechanism when the switch mode selector is set for instantaneous and the solenoid is energized;

FIG. 26 shows the positions of the parts when the switch mode selector is set for instantaneous and the solenoid is deenergized.

DETAILED DESCRIPTION OF THE INVENTION

Figure 1:
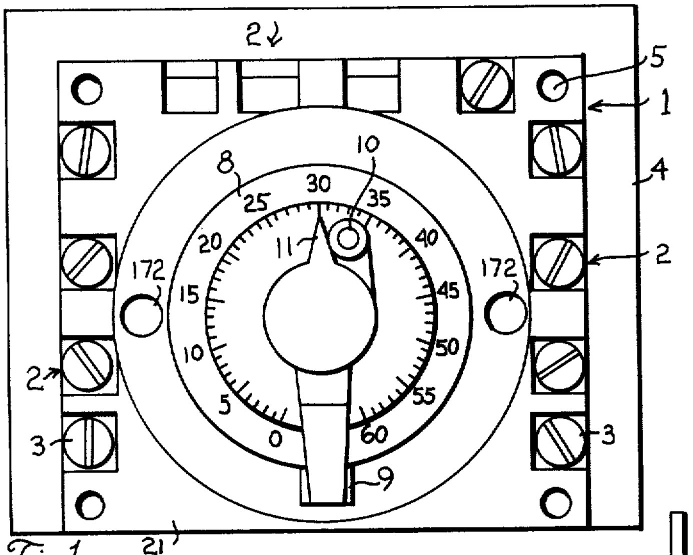
FIG. 1 is an external end view of a timer embodying the invention showing the wiring terminals and dial mechanism.
Figure 2:
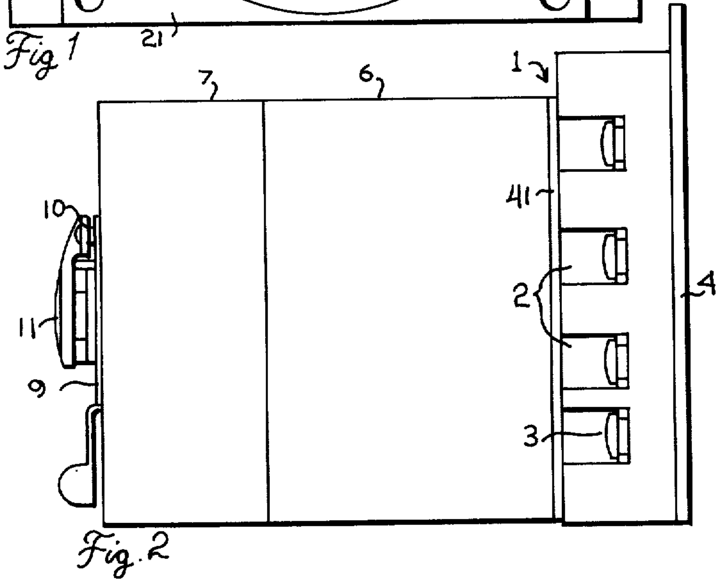
FIG. 2 is a side view of FIG. 1.

Referring to FIGS. 1 and 2, the timer includes a base member 1 which is generally rectangular, having a series of terminal screw slots 2 which receive a series of terminal screws 3 for making external connections to the timer switches and other electrical components. Preferrably the switch base 1 is provided with a barrier 4 which serves to provide additional insulation between the terminal screws and the panel upon which the timer is mounted. This barrier 4 also may carry indicia (not shown) for identifying the various terminals. The timer may be mounted on a suitable support by screws extending through mounting holes 5 which extend both through the switch base and the barrier.

The timer mechanism is mounted within a housing which consists of a tubular sleeve 6 and a removable moulded front housing member 7. The front housing member 7 carries a dial 8, an adjusting pointer 9 carrying a movable stop 10, and a progress pointer 11.

Figure 3:
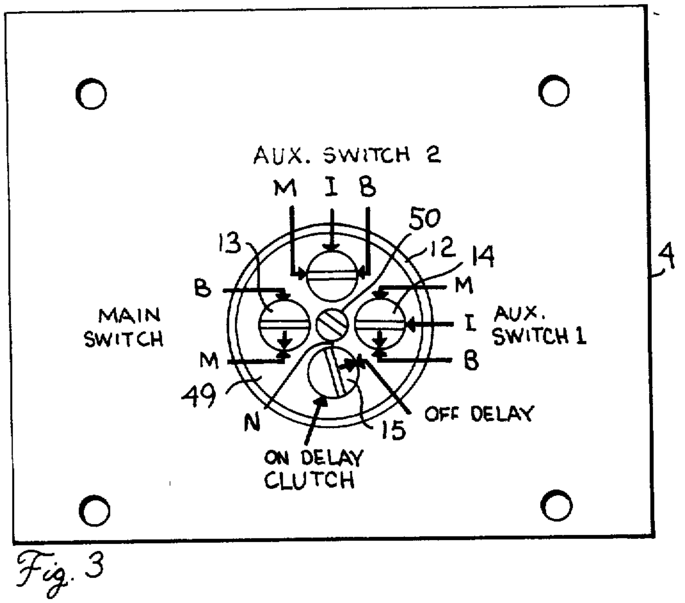
FIG. 3 is a rear view showing the mode selectors.

As shown in FIG. 3, the barrier 4 is provided with a central hole 12 which exposes the screw heads or adjusting elements of switch mode selectors 13 and 14 and a clutch mode selector 15. The mode selectors are provided with arrows as shown which cooperates with indicia on the barrier 4 for indicating the setting of the various mode selectors. As will be described later, setting of these various mode selectors determines how the timer will respond to the external control circuitry.

Figure 6:
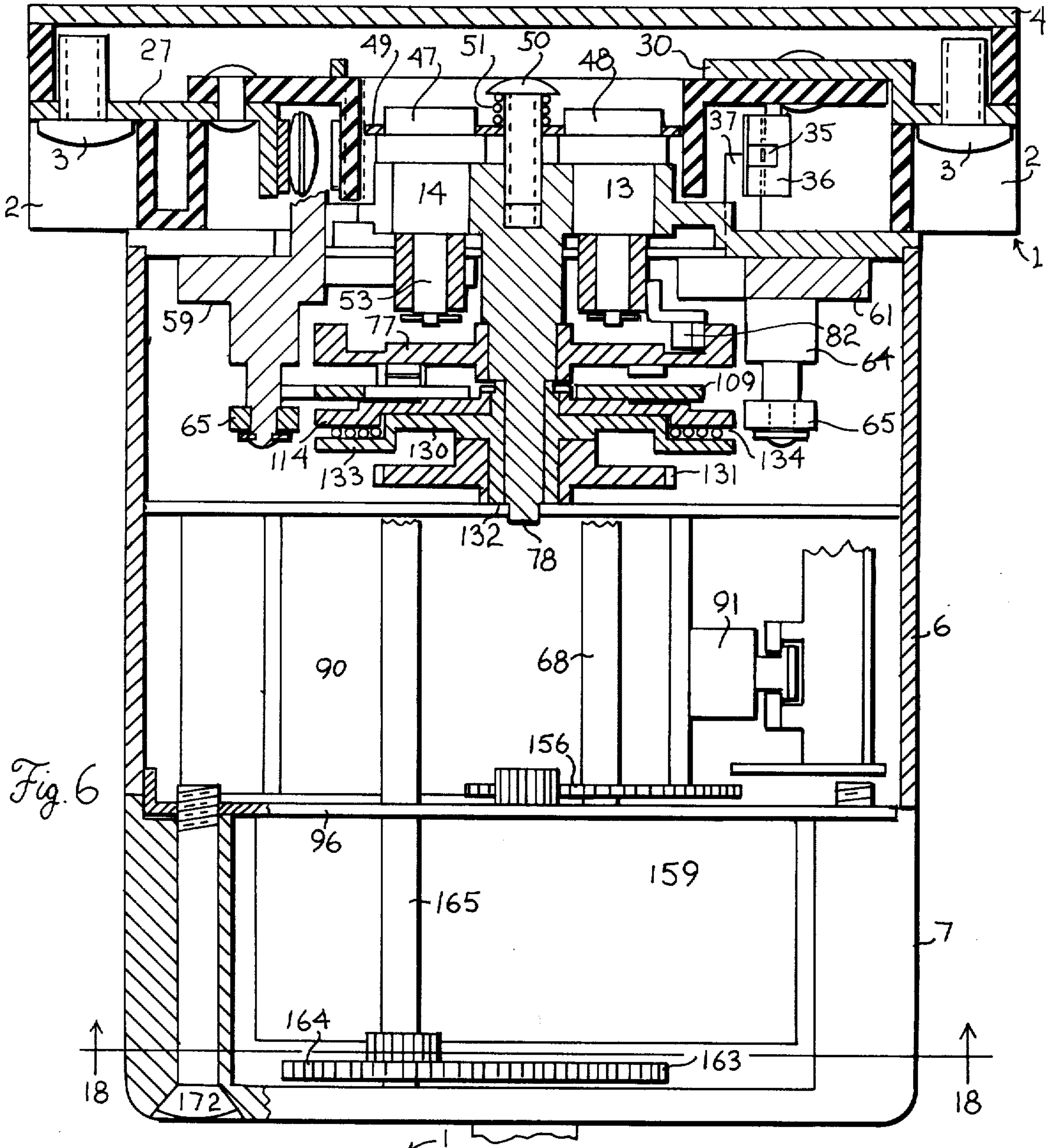
FIG. 6 is a top sectional view taken on lines 6—6 of FIGS. 7 and 8.
Figure 7:
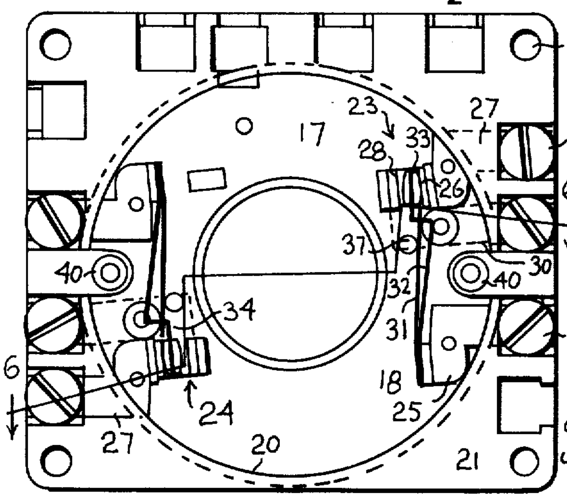
FIG. 7 is a view of the switch base assembly prior to installation of other components.
Figure 11:
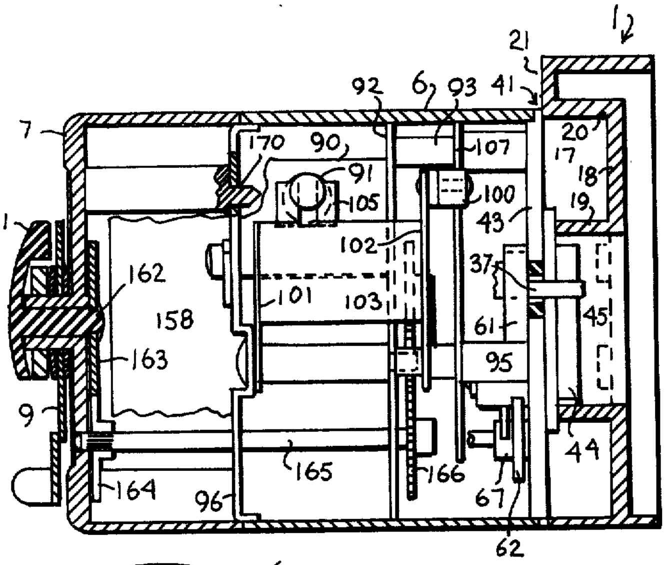
FIG. 11 is a side sectional view showing the timer construction with certain parts omitted.

As shown more clearly in FIGS. 7 and 11, the switch base 1 is formed with a donut-shaped recess 17 having a bottom wall 18, an inner circular wall 19, and an outer circular wall 20. The switch base 1 is also formed with a front wall 21 surrounding the switch recess 17. Recess 17 accommodates a plurality of isolated and identical switches generally indicated as 23 and 24. Provision is made for another switch which has been omitted from the drawings. Each switch consists of a switch blade bracket 25 which is suitably mounted on the bottom wall 18 and extends through outer wall 20 into the terminal area receiving a terminal screw 3. Each switch also includes a timed-out contact 26 carried by a bracket 27 which is mounted on bottom wall 18 and extends through outer wall 20 into the terminal area receiving another terminal screw 3. Each switch also includes a timing contact 28 carried by a terminal bracket 30. This terminal bracket is preferrably mounted on the outside of the bottom wall 18, having one portion extending through a suitable opening in the bottom wall and carrying contact 28 and having another portion extending into the terminal area receiving a terminal screw 3. The contact bracket 25 carries two blades 31 and 32, the blade 32 carrying a double contact 33 located between the timing contact 28 and timed-out contact 26. This blade is formed with an offset portion 34 through which a reduced portion 35 of blade 31 extends. Blade 32 serves to conduct the current and is biased outwardly toward engagement with the timed-out contact 26. Blade 31 does not carry the current but serves as an operator for the blade 32. This blade 31 is biased inwardly tending to pull blade 32 into engagement with the timing contact 28. When blade 31 is free, its bias overcomes the opposite bias of blade 32 and pulls blade 32 inwardly causing engagement of contact 33 with the contact 28. However when blade 31 is pushed outwardly as by an operating pin 37 it will allow corresponding movement of blade 32 thus disengaging contact 28 and engaging the contact 26. As shown in FIG. 6, the reduced end portion 35 of blade 31 extends through a slot 36 in the offset portion 34 of the switch blade 32. This arrangement allows for overtravel movement of blade 31 after contacts 26 and 33 engage. This arrangement permits overtravel of the operation pin 37 without undue pressure buildup.

Figure 8:
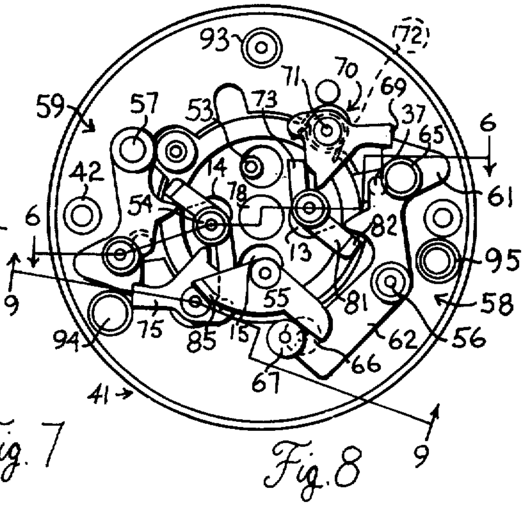
FIG. 8 is a view of the mechanism base assembly with certain parts omitted.

As shown in FIG. 7 the switch base is formed with two end bosses 40 which extend inwardly into the recessed portion 17. These bosses serve to receive mounting screws (not shown) for securing the mechanism base 41 in place (FIG. 8), such mounting screws being received in corresponding bosses 42 in the mechanism base. As shown more clearly in FIG. 11, the mechanism base includes a generally flat portion 43 covering the open end of the donut-shaped switch cavity 17 in the switch base. This mechanism base also includes a mode selector section 44 which extends rearwardly into the opening 45 in the switch base which is formed by the inner wall 19. This mode selector section is formed with circular openings receiving the mode selectors 13, 14, and 15 (FIG. 6 and 8). The mode selectors are identical and include circular shoulder portions 47 and reduced screw driver slot portions 48, these reduced screw driver slot portions being accessible from the rear of the timer as shown in FIG. 3. The mode selectors are held in place by a locking plate 49 which is provided with holes through which the screw driver slot portions extend, this plate bearing on the shoulder portions 47 of the mode selectors. Plate 49 is locked in place by means of a set screw 50 which is threaded into the solid central portion of the mode selector area 44. Preferably a compression spring 51 is installed between plate 49 and the head of locking screw 50 so as to provide yieldable pressure on plate 49 when the locking screw is backed off.

The mode selectors are also provided with inwardly extending bearing portions 53 which are mounted eccentrically relative to the main cylindrical portions of the mode selectors. This is more clearly shown in FIG. 8. These eccentric bearings of mode selectors 13 and 14 carry latch operators or controllers 54 while the eccentric bearing of mode selector 15 carries a clutch operator or controller 55. These operators are formed with elongated bearing portions and are preferably held in place by staked washers allowing free rotation of the operators on their bearings.

The mechanism base 41 is also provided with switch operator studs 56 and 57 which serve as bearings for a main switch operator or controller 58 and an auxiliary switch operator 59. The main switch operator 58 includes an elongated bearing portion 60 fitting over stud 56, a switch operator lever 61 and a clutch operating lever 62. The switch operating lever portion 61 is located adjacent the main surface of mechanism base 41 and carries the switch operating pin 37 which actuates blade 32 of the main switch 23, (FIGS. 6 and 7). This pin extends through a suitable slot formed in the mechanism base. The switch operating lever 61 also includes a forwardly extending portion 64 carrying a roller 65. The clutch operating lever portion 62 of operator 58 extends downwardly and to the left and is formed with a camming surface 66 arranged to engage a clutch operating roller 67 carried by clutch shaft 68.

The upper end of switch operator lever 61 is formed with a latching surface 69 which is engaged by latch 70 carried by stud 71 on mechanism base 41. Latch 70 when in place as shown in FIG. 8 holds the switch operator in position to locate stud 37 as shown in FIG. 7 in which the switch blade contact is in engagement with the timed-out contact 26. Latch 70 is biased in latching direction by a spring 72 and is rotatable counterclockwise for unlatching by lever portion 73 of the latch operator mounted on mode selector 13. It will be apparent that rotation of the latch operator in a clockwise direction causes lever portion 73 to rotate latch 70 in releasing direction, this releasing the switch operator lever portions 61 which allows the swtich operating pin 37 to move to the left as seen in FIG. 7 and allow engagement of the movable contact 33 with the timing contact 28.

Figure 9:
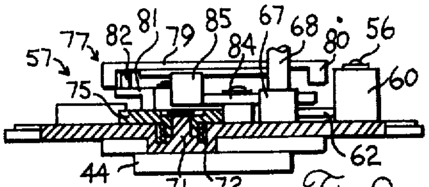
FIG. 9 is a sectional view taken on line 9—9 of FIG. 8.

The switch operator 59 is identical in construction with switch operator 58 with the exception that the clutch operating lever 62 is omitted. This switch operator is controlled by a latch 75 which is identical with latch 70. As shown in FIG. 9, the latches have their latching portions adjacent the main surface of the mechanism base, this being permitted by recessing of the latch studs 71 and springs 72.

The latch operating levers 54 and clutch operating lever 55 are actuated by means of a solenoid wheel 77 which overrides these controllers as shown in FIGS. 6 and 9. This solenoid wheel 77 is carried by a stud 78 which is mounted centrally on the mechanism base and serves as a main bearing axis for the solenoid wheel and other timing mechanism components which will be described. This solenoid wheel is preferably formed with an elongated bearing section fitting on a matching portion of the bearing stud 78, a relatively flat portion 79 extending outwardly from the bearing and carrying a series of abutments 80 which extend inwardly toward the mechanism base. The latch operating levers are provided with lever portions 81 which extend outwardly from the lever bearings, these lever portions having upturned ears 82 which extend up into the solenoid wheel so as to be operated by the abutments 80.

The clutch operator 55 includes a bearing rotatably mounted on the eccentric bearing on mode selector 15 and a clutch operating lever 84 extending into proximity with the clutch operating roller 67, the lever portion 84 overlying the clutch lever 62 of operator 58. The clutch operator 55 also includes an ear 85 which extends into the solenoid wheel so as to be actuated by the abutments 80.

The solenoid wheel 77 is driven in a counterclockwise direction step by step by in and out movements of a solenoid by a mechanism which will now be described. A solenoid 90 (FIG. 11 and 12) having a plunger 91 is mounted on a solenoid plate 92 by means of spacers 93, 94, and 95 which are preferably moulded integrally with the mechanism base 41. A motor plate 96 is mounted forwardly of solenoid 90 and is supported by means of three spacers 97 which thread into the spacers 93, 94, and 95. These spacers 97 thus serve to support the motor plate 96 and also to secure the solenoid plate 92 to the three moulded spacers. The solenoid plunger 91 operates a solenoid lever 99 carrying a roller 100. This solenoid lever includes a leg portion 101 which is located behind motor plate 96 and rotates freely on a reduced shoulder portion of spacer 97. Lever 99 also includes a leg 102 which is located behind the solenoid plate 92 and which carries the roller 100. Leg 102 of the solenoid lever is rotatably supported on a reduced portion of the moulded spacer 95. Legs 101 and 102 are connected by a transverse section 103 which straddles the solenoid plate 92, this plate being notched as at 104 to accommodate the lever. The transverse section 103 of the solenoid lever includes ears 105 which straddle a reduced portion 106 of the solenoid plunger 91. When the solenoid 90 is deenergized, the plunger 91 is out and the roller 100 assumes the position shown in FIG. 13 adjacent the inner edge of the tubular housing member 6. When the solenoid is energized the plunger pulls in, rotating lever 99 counterclockwise and moving roller 100 inwardly to the position shown in FIG. 10.

Figure 10:
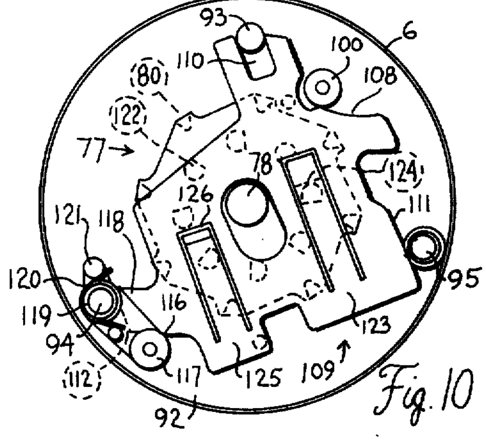
FIG. 10 is a view similar to FIG. 8 but showing the solenoid slide and solenoid wheel construction.

The roller 100 rolls on a camming surface 108 formed on a solenoid slide generally indicated as 109. This solenoid slide is supported by the spacers 93, 94, and 95. The upper end of the slide as seen in FIG. 10 is provided with a notch 110 which fits over a reduced diameter of spacer 93 and bears against a shoulder on this spacer which serves to space it from the mechanism base 41. The lower right hand part of solenoid slide 109 is formed with a guiding surface 111 which bears against a shoulder on the spacer 95 and the other side of slide 109 is formed with a guiding surface 112 which bears on a similar shoulder on spacer 94 (see FIG. 15). This slide is maintained against the spacer shoulders by the rear surface of the timer camming disc 114 as shown in FIG. 6. This camming disc 114 is part of the timing mechanism described later in this specification.

The solenoid slide 109 is formed with a camming surface 116 at its lower left hand corner upon which rides a roller 117 carried by a spring lever 118 having a bearing 119. This bearing 119 fits over a reduced portion of the spacer 94 in front of the slide 109 and carries a torsion spring 120. One leg of this spring bears upon a stud 121 on lever 112 and the other leg bears on a stud attached to the solenoid plate 92. The spring 120 thus biases the arm 112 in a counterclockwise direction thus causing the roller 117 to bear against the camming surface 116 of the slide thus camming this slide upwardly.

It will be apparent that when the solenoid moves from its out position to its in position, roller 100 rides up the camming surface 108 of the slide thus pushing the slide downwardly as seen in FIG. 10. During this downward motion of the slide, the camming surface 116 acting on roller 117 drives the spring lever 118 in a clockwise direction about its bearing thus winding the spring 120. When the solenoid is deenergized the roller 117 acting on camming surface 116 raises the slide to the position shown in FIG. 13 this causing the solenoid roller to be driven to its outer position adjacent the housing member 6.

This reciprocating motion of the solenoid slide serves to drive solenoid wheel 77 step by step in a clockwise direction. This action is accomplished by a series of lugs 122 formed on the front of the wheel, one lug 122 being provided for each rearwardly extending abutment 80. The slide 77 is provided with an integral ratchet spring 123 extending on the right hand side of bearing 78 for the solenoid wheel. This ratchet spring is provided with a ratchet surface 124 arranged to engage the rear surface of a lug 122. Slide 77 is also provided with an integral ratchet spring 125 arranged on the left hand side of bearing 78 of the wheel, this ratchet spring having a ratchet surface 126 arranged to engage abutments 122.

FIG. 10 shows the positions assumed by the parts when the solenoid is energized. At this time roller 100 is in its inner position and has moved the solenoid slide to its down position and the ratchet surface 124 engaging one of the lugs 122 has moved the ratchet wheel to the position indicated. At this time the opposite lug 122 has passed beyond the ratchet surface 126 and the ratchet spring 125 has snapped in behind this lug. When the solenoid is deenergized, the spring lever 118 is free to lift the solenoid slide upwardly as seen in FIG. 10. The ratchet surface 126 now engages the adjacent abutment 122 and rotates the wheel 77 one step to the position shown in FIG. 13. At this time the ratchet surface 124 of spring 123 has snapped in behind its adjacent lug 122 and is thus in position to rotate wheel 77 another step when the solenoid is again energized.

In the embodiment of the inventin illustrated, the solenoid wheel is provided with eight operating abutments and eight driving lugs 122. The lugs and abutments are equally spaced being 45° apart. The motion of the solenoid slide is designed to drive the wheel 22.5° when the slide moves downwardly and to drive the wheel the remaining 22.5° when the slide moves upwardly. Thus one full cycle of operation of the solenoid slide rotates the wheel through one spacing of the abutments. This arrangement prevents the solenoid wheel from ever getting out of step with the slide.

It will be apparent that the reciprocating power mechanism described drives the solenoid wheel in steps corresponding with the position of the solenoid, and that the abutments acting on the latch operators and clutch operator serves to release the latches 72 and 75 and operate the clutch in accordance with the pull-in or drop-out of the solenoid 90. The details of these controlling actions will be described later in this specification.

Figure 14:
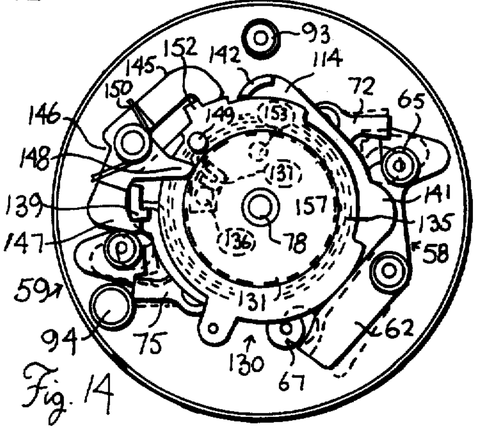
FIG. 14 is a front view showing the timing mechanism and with the solenoid slide omitted.

The switch operators 58 and 59 are raised with snap action at the end of a period of time to a point where latches 72 and 75 can come into place as shown in FIG. 8 by means of a timing mechanism shown in FIGS. 6, 14, and 15. This timing mechanism includes the cam disc 114 a spring winder 130 and a timing gear 131. The timing gear, spring winder, and camming disc are mounted on the main bearing axis 78 as shown in FIG. 6. Preferably the spring winder is formed with an elongated hub 132 extending on both sides of the body portion of the spring winder. The front portion of this hub 132 acts as a bearing for the timing gear 131 and the rear portion of hub 132 supports the cam disc 114. This spring winder is formed with an annular offset portion 133 which provides a recess 134 which receives a helical spring 135 as shown in FIG. 14. The camming disc 114 is provided with a slot 136 into which an ear 137 on the spring winder 130 extends. This ear 137 is formed with a recess which receives one end of spring 135. The other end of spring 135 has a turned out portion extending under a latching ear 139 which extends forwardly from the cam disc 114. It will be apparent that the spring 135 biases the cam disc 114 counterclockwise relative to the spring winder 130 and normally holds the upper edge of the slot 136 into contact with the upper edge of ear 137 as shown in FIG. 14.

The camming disc is formed with three separate camming surfaces 141, 142, and 143 (FIG. 17) which are located 90° apart about the main bearing axis 78. Cam surface 141 cooperates with roller 65 on switch operator 58 for raising this roller to the timed-out position. Camming surface 143 cooperated with the roller on switch operator 59 for moving this operator to the timed-out position. Camming surface 142 is available for operating the switch operator of a third switch not shown. It is also used for releasing a lock-out latch 145 which is pivoted on the elongated switch operator stud 57 attached to the mechanism base 41. Also mounted on the stud 57 forward of the lock-out latch 145 is a timed-out latch 146. This timed-out latch has a latching portion 147 extending into the pair of latch member 139 on the camming disc 114. Latch 146 also includes an operating lever 148 which extends into the path of a pin 149 forming part of the spring winder 130. The locking latch 145 and timed-out latch 146 are biased inwardly by a single spring 150 which bears against shoulders on both latches.

FIG. 14 shows the positions of the timing mechanism components at all times except when the end of a timing period is approaching. A spring 151 shown schematically urges the spring winder 130 clockwise causing a projection 152 on this spring winder to engage the locking latch 145. The locking latch 145 at this time serves as a stop of reference point for the spring winder 114. The timed-out latch 146 is also in place, the latch portion 147 being in the path of the latch section 139 on the camming disc 114. The spring 135 at this time has urged the camming disc 114 to its normal position in which the edge of slot 136 abuts the ear 137 on the spring winder. The latches 145 and 146 at this time effectively locate the cam disc 114 in a position in which the camming surfaces do not influence the positions of the switch operators 58 or 59. Thus the switch operators may be in the upper latched position as shown in full lines or in the down position as shown in the dotted lines.

Figure 12:
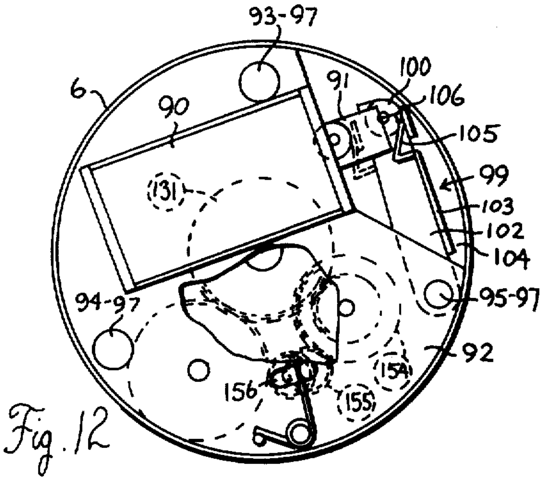
FIG. 12 is a front view showing the solenoid and solenoid lever construction.
Figure 13:
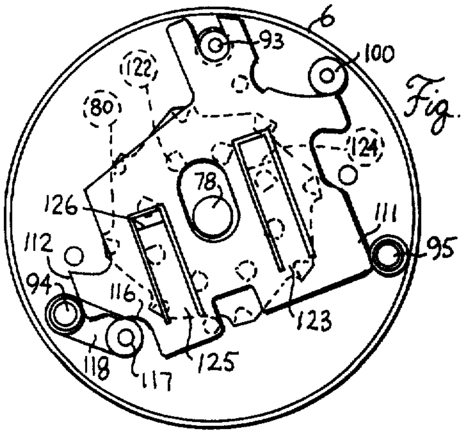
FIG. 13 is a view similar to FIG. 10 but showing the solenoid slide in the position assumed when the solenoid is deenergized.

The timing gear 131 as mentioned before is located forward of the spring winder 130 and includes a pin 153 which extends rearwardly into an engagement with a forwardly extending projection of the ear 137. To clarify, the ear 137 on the spring winder extends on both sides thereof, one part extending into the slot 136 of the cam disc and the other part extending into the path of pin 153 on the timing gear. As shown in FIGS. 12 and 19 the timing gear 131 is driven by a reduction gear and pinion 154 mounted on a stud carried by the solenoid plate 92. This gear 154 is driven by a clutch pinion 155 carried by the clutch shaft 68. This clutch shaft 68 extends through a slot 156 in the solenoid plate and is journaled in the motor plate 96. Shaft 68 also carries a drive gear 157 meshing with the motor pinion 158 of the timer motor 159 mounted on motor plate 96. As shown in FIG. 12 the slot 156 is arranged at an angle to the gear 154 and allows the shaft 68 to move in a direction separating the clutch pinion 155 from gear 154. A spring 157 serves to bias the shaft and clutch pinion in clutch engaging direction.

When the clutch is engaged and the motor 159 energized, the timing gear 131 is rotated at a counterclockwise direction as seen in FIG. 14. When the clutch is disengaged by moving pinion 155 away from gear 154 the timing gear 131 is rotated clockwise by a reset spring 160 until it is stopped by the adjustable setting mechanism which will now be described.

As shown in FIG. 11, the progress pointer 11 has a shaft 162 which extends through a bearing formed on front housing member 7 and carries a gear 163 which meshes with a gear 164 carried by a shaft 165. The front end of shaft 165 is journaled in the front wall of housing member 7 and the rear end of this shaft is journaled in solenoid plate 92. The rear end of shaft 165 carries a gear 166 which meshes with the gear 131. Preferably the gear 163 has the same number of teeth as gear 131 and gears 164 and 166 also have the same number of teeth. This arrangement causes the progress pointer 11 to rotate with the timing gear 131 in the same direction and at the same speed. Thus progress pointer 11 is synchronized with the timing gear and indicates the position of the timing gear. As shown in FIG. 1, the progress pointer 11 indicates the position of the timing gear on the dial 8. The clockwise rotation of progress pointer 11 is stopped by the stop 10 carried by the adjusting pointer 9. As described later, the progress pointer 11 is set relative to the timing gear 131 so that the timer shifts from timing to timed-out positions when progress pointer 11 reaches "0" position on dial 8. Thus setting of the pointer 9 on dial 8 determines the length of time that the timer will run between the starting position from stop 10 back to the 0 position.

In order to obtain accurate timing it is necessary in the final assembly of the timer to synchronize progress pointer 11 outside the case with the position of the timing gear 131 inside the case. The manner in which this is accomplished will now be described.

As shown in FIG. 14, the normal position of the spring winder 130 is with the lug 152 in engagement with the lock-out latch 145. This is caused by the tension of the spring 151 which urges the spring winder 130 in a clockwise direction. In the absence of the external stop 10 on setting pointer 9 the timing gear 131 will be rotated by reset spring until the pin 153 engages the lower side of extension 137 on the spring winder. As the position of the spring winder is fixed by the lug 152 engaging latch 145, the lug 137 has a definite known position and this in turn sets the timing gear to a definite known or reference position.

As shown in FIGS. 11 and 18, the front housing member 7 is formed with rearwardly extending and pointed pins 170 which extend through closely fitting openings formed in the motor plate 96. Also as shown in FIG. 18, the shaft 165 is located in a slot 171 in the motor plate. The pins 170 serve to hold the front housing member 7 at the proper angular position while this housing member is being mounted on motor plate 96.

Before this mounting operation is performed, the adjusting pointer 9 is set at a position on dial 8 corresponding to the location of the timing gear determined by its engagement with the bottom of lug 137. This position with the parts proportioned as shown is approximately 15° clockwise of the maximum scale setting.

During the final assembly step, the pointer 11 is held against the stop 10 on the adjusting pointer and its location outside the enclosure is in synchronism with the position of the gear 131. The projections 170 of the front enclosure locate the angular position of the housing member before gear 163 meshes with the gear 164. As shaft 165 is located during this assembly operation to be in alignment with its bearing hold in housing 9 and as the front end of this shaft is tapered as shown in FIG. 11, the gears 163 and 164 become meshed with the pointer 11 properly located relative to the timing gear 131. The front housing is now secured in place by screws 172 which thread into the motor plate 96.

It should be noted that with the construction described, the motor 159 is the last component to be installed before attachment of a front housing member 7. This makes the motor easily accessible for replacement simply by removal of the front housing member. More important this arrangement facilitates manufacture of the timer as the motor speed and dial on the timer must be related. In the construction provided by this invention, the motor and the housing carrying the dial are the last items installed. This makes it possible to delay determination of the timing range until the last steps of final assembly, making it possible to make volume runs of the main timer mechanism and then add the motor and front housing as dictated by incoming orders.

OPERATION OF TIMING MECHANISM

FIG. 14 shows in full lines the positions of the parts assumed when the timer is in timed-out position. Thus latch 72 is in latching position relative to the switch operator 58 and latch 75 is in latching position relative to switch operator 59. This is holding the switch operators in positions for causing switches 23 and 24 to be engaged with timed-out contacts 26. Also spring winder 130 is in its normal position in which lug 152 engages locking latch 145. The main spring 135 is now holding lug 137 of the spring winder in engagement with the upper edge of the slot 136 in the camming disc 114. The camming surfaces 141 and 143 on the camming disc are spaced from the rollers 65 on the switch operators 58 and 59 and the timed-out latch 147 is in position under the latching surface 139 on the camming disc 114. As the switch operator 58 is in latched position the clutch operating arm 62 of this operator has cammed the clutch roller 67 to its clutch disengaging position. As the clutch is disengaged, the reset spring for the timing gear 131 has rotated this gear clockwise until it has reached its starting position as determined by the setting of the external time adjusting pointer 9.

The switches are transferred to timing position by release of latches 72 and 75 in the manner described later. These latches are rotated counterclockwise toward releasing direction and when released the latches and switch operators assume the dotten line positions shown in FIG. 14. The switch operators rotate counterclockwise when released, and the rollers engage the camming surfaces 141 and 143 of the camming disc 114 as shown in FIG. 16. This releasing of the switch operators permits them to release their corresponding pressures on switches 23 and 24 and these switches assume the timing positions in which the stationary contacts 28 are engaged. Release of the main operator 58 also causes the clutch operator lever 62 to disengage the clutch roller 67 allowing the clutch to engage.

As the timer motor is continuously energized, the engagement of the clutch causes the timing gear 131 to rotate counterclockwise and the progress pointer 11 rotates with it. As the progress pointer 11 approaches the 0 position on the dial the pin 153 on gear 131 engages lug 137 and rotates the spring winder 130 counterclockwise. At this time, the camming disc 114 is restrained from rotation by the timed out latch 146 being in the path of latching lug 139 on the camming disc. At this time the lug 137 on the spring winder separates from the edge of slot 136 in the camming disc as shown in FIG. 15. The spring 135 is thus being wound to supply power for operating the switches to their timed-out position. As the end of the timing period approaches, the pin 149 on the spring winder engages the lever 148 of timed-out latch 147 rotating this latch clockwise to the timed-out position shown in FIG. 16. At this point the timed-out latch 147 releases latching surface 139 allowing spring 135 to rotate the camming disc 114 with snap action. During this motion, the camming surfaces 141 and 143 lift the rollers of switch operators 57 and 58 to the positions shown in FIG. 17 in which the latches 72 and 75 return to latching position for holding these operators in timed-out position.

During the motion of the main switch operator 57 toward the timed-out position, the clutch arm 62 engages the clutch roller 67 and the clutch becomes released before the switch operator is actually moved far enough to be held by latch 72. If it were not for other means, the force applying pressure to spring 135 would disappear and there would be no power for getting switch operator 57 to its timed-out position. At this point the locking latch 145 performs its function as it is in the path of the latching surface 172 on the spring winder. When the clutch is released, the timing gear 131 is free to return to its starting position and the reactive forces of the switch operators on the camming surfaces act through spring 135 tending to rotate the spring winder clockwise, this rotation being restrained by engagement of latching surface 172 with the locking latch 145. This locking latch thus maintains the tension on the spring 135 causing the camming disc 114 to complete its stroke and lift switch operators 57 and 58 to the positions shown in FIGS. 17. Here the switch operators have cleared their respective latches allowing the latches to come into place. After this has occurred, the camming surface 142 on camming disc 114 raises the locking latch 145 to clear latching surface 172. The spring 151 now returns the spring winder to the position shown in FIG. 14 and the timing mechanism is in condition for starting the next cycle when the main latch 72 is again released.

From the foregoing it will be apparent that as long as the main switch operator is held in latches position by the main latch 72 the clutch will be disengaged. The timer motor thus may operate continuously. Also the timing mechanism is in reset condition ready to start a new cycle when the main latch 72 is released and the clutch is engaged. This latch is released by the solenoid 90 at the command of an external control switch 175 shown in FIG. 4. This latch may be released either by making pilot switch 175 or breaking it depending upon the setting of the mode selector 13 (FIGS. 3 and 8).

OPERATION OF SWITCHES BY SOLENOID "M" SHIFT ON MAKE

The operation of the switches by the solenoid in this mode are identical and for convenience, operation of latch 75 of the auxiliary switch is described. In FIG. 23 the abutments 80 on the solenoid wheel are shown in full lines in the positions when the solenoid is out, and in dotted lines in the positions assumed when the solenoid is in. When the solenoid is energized, the abutment 80 adjacent the operating end 82 of latch operator 54 moves from the position "out" to the position "in" which may be termed the pull-in range of the solenoid wheel. This movement of the wheel through its pull-in range rocks latch operator 54 clockwise which in turn rotates latch 72 counterclockwise to release the switch operator 59. When the lug 80 of the solenoid wheel reaches the in position of FIG. 23 it has passed beyond the range of contact with operator 82 of the latch operator 54. As a result the latch operator 54 is released by the solenoid wheel and the latch 72 is thus free to return to latching position with the solenoid in its in position.

Summarizing when the mode selector is in its M position the latch is released by the movement of the solenoid wheel through its pull-in range. Thus the switch is shifted from timing to timed-out by energization of the solenoid. After the solenoid has pulled in it has no further effect on the latch operator and the latch can return to its latching or timed-out position irrespective of whether the solenoid is energized or deengergized. This means that for this mode of control, closure of the switch in the control circuit of the solenoid can be either momentary or sustained.

SHIFT ON BREAK SETTING

If it is desired to have the switch transfer from timed-out to timing on a break of the control circuit, the mode selector 14 is shifted to the "B" position as shown in FIG. 24. This moves the pivot for latch operator 54 to its down position and this latch operator is thus bodily shifted so that it is actuated by the abutment 80 on the solenoid wheel when it moves from its in position to its out position (drop-out range). The abutment 80 releases the latch operator 54 before it reaches its out position so that the solenoid no longer has any effect on the position of the latch. Thus the timing mechanism may return the switch back to its timed-out position regardless of whether the solenoid is energized or deenergized.

INSTANTANEOUS SETTING

When it is desired to have the auxiliary switch 24 controlled only by the solenoid, the mode selector 14 is shifted to the "I" position as shown in FIGS. 25 and 26. This movement shifts the pivot for the latch operator outwardly toward the switch operator 59 and latch 72. With this position of the mode selector, the latch operator is controlled in part by the solenoid in its pull-in range and in part by the solenoid in its drop-out range. FIG. 25 shows the positions of the parts when the solenoid is energized and FIG. 26 shows the parts when the solenoid is deenergized.

Referring to FIG. 25, when the solenoid is energized, the solenoid wheel is in a position in which the operating end 82 of latch operator 54 is free of all of the abutments 80 on the solenoid wheel. In this position an extension 180 on switch operator 59 is engaged by an underlying lever portion 181 of the latch operator 54. The arm 73 of the latch operator is in engagement with the right hand face of the latch 72 and the latch 72 is held out of the path of switch operator 59. In this position of the parts, the biasing spring for latch 72 applies counterclockwise pressure on the latch operator 54 which in turn urges the switch operator 59 counterclockwise or outwardly which moves the switch 24 to its outer or timed-out position. Summarizing when the solenoid is energized, the solenoid wheel is in a position so that it does not effect the latch operator 54 and the latch spring acting through the latch holds latch operator 54 in position to hold the switch 24 in its timed-out position.

When the solenoid is energized, the adjacent abutment 80 on the solenoid wheel causes clockwise movement of latch operator 54 to the position shown in FIG. 26. This clockwise rotation of the latch operator causes its section 181 to release the extension 180 on the switch operator which allows the switch 24 to move to its timing position. This movement causes the latch 72 to rotate counterclockwise to the position shown. This provides a biasing force for returning the latch operator to the position shown in FIG. 25 when the solenoid is again energized. Preferably the parts are proportioned so that the motion of the latch 72 decreases relative to motion of the latch operator as the latch operator rotates clockwise. This reduces the biasing force of the latch spring at the time when it is not needed thus reducing the power required to operate the solenoid wheel.

CLUTCH OPERATION — ON DELAY SETTING

When it is desired to release the clutch under the control of the solenoid and have the clutch release when the solenoid drops out, the clutch mode selector 15 is moved to location "on". In this position, the pivot for the clutch operator 66 is located as shown in FIG. 20. When the solenoid is out or deenergized, the adjacent lug 80 on the solenoid wheel is under the operating portion 85 of the clutch operator and this holds the clutch roller 67 in the released position as shown. When the solenoid is deenergized, the solenoid wheel is moved through its drop-out range and the lug 80 assumes the dotted line position where it is clear of the clutch operator. The clutch spring 157 is now free to move the clutch pinion 155 into engagement with the clutch gear 154.

From the foregoing it will be apparent that when the clutch mode selector is in the On Delay setting, the clutch will be released anytime the solenoid is deenergized. Thus the timer will reset to starting position in response to either a power failure or an opening of the solenoid control circuit.

SOLENOID OPERATION — OFF DELAY SETTING

If the control requirements call for resetting the timer in response to closure of the control circuit, the clutch mode selector is shifted to its Off Delay setting as shown in FIG. 21. With this position of the mode selector when the solenoid pulls in, the adjacent solenoid wheel abutment 80 moves through its pull-in range and assumes the dotted line position as shown in FIG. 21. This rocks the clutch operator 66 clockwise and cams the clutch roller 67 to its disengaged position. When the solenoid is deenergized the abutment moves through its drop-out range to the full line position thus disengaging the clutch operator and allowing the clutch to reengage. With this position of the mode selector, energization of the solenoid resets the timer and the solenoid thus must be deenergized in order for the timer to operate.

CLUTCH OPERATION — NEUTRAL SETTING

In applications where it is desirable for the timer to hold its position on power failure or to perform its timing function regardless of the condition of the solenoid, the clutch mode selector is moved to its "N" (neutral) position as shown in FIG. 22. In this position of the clutch mode selector, the clutch operator is out of contact with the clutch roller regardless of the position of the solenoid wheel. In other words movement of the solenoid wheel through either its pull-in range or drop-out range has no effect on the clutch.

SUMMARY OF OPERATION

From the foregoing description it will be apparent that the timing unit of the invention includes an automatic reset timer mechanism which moves the switch operators or controllers from timing position to timed-out position at the end of a selected time. It will further be apparent that the timing gear or element at the end of the cycle serves to drive the spring winder for winding the spring which drives the camming means for actuating the switch operators. This motion is initially resisted by the timed-out latch which is released at the end of the cycle. The power now stored in the spring is released for operating the camming means 114 which now raises the switch controllers to their timed-out positions. As the main switch controller approaches its timed-out position it releases the clutch allowing the timing gear to reset. However complete reset of the timing means is delayed by the lockout latch means 145 holding the spring winder thus maintaining tension on the main spring until the camming means completes its timed-out stroke. At this time the cam wheel releases the lock-out latch or delaying means, allowing the spring winder portion of the timing means to reset to its normal position in which the camming means is once again held by the timed-out latch.

It will further be apparent that the switch controller latches serve to maintain the switch controllers in timed-out position and that release of these latches returns the switches and clutch back to timing position.

The release of these latches is controlled by the solenoid which reciprocates, this causing reciprocating motion of the solenoid slide which drives the solenoid wheel through one operating range of movement when the solenoid pulls in and a different range of movement when the solenoid drops out. This solenoid wheel serves as a drive member for the latch and clutch operators which form part of mechanical linkages between the solenoid and the clutch and switches. The mode selectors which bodily shift these controllers serve as selective means to adjust the mechanical linkages for changing the manner in which the timer responds to the solenoid.

The use of the camming surfaces 108 and 116 on the solenoid slide decreases the solenoid size required by proportioning the forces available with the forces required.

The force exerted by slide return spring 120 decreases as it unwinds in raising the slide. At the same time this spring force is decreasing, the force required to rotate the solenoid wheel to operate the clutch and latches is increasing. This reduction oF spring forcee at a time when more force is required is counteracted by characterizing the camming surface 116, to decrease the rate of movement of the slide as the spring 120 unwinds. This in effect gives the spring more leverage as it unwinds and compensates for the spring rate of the spring and the varying load encountered.

The camming surface 108 permits use of a long solenoid stroke which gets more work out of a solenoid of given size. The pull provided by the solenoid plunger varies with its position, being low when it is out and increasing as it moves toward its seat. Camming surface 108 is characterized to increase it movement of the slide as the plunger pulls in. This camming surface is also preferably designed to proportion the force provided by the solenoid in accordance with the resistance to movement of the slide caused by the return spring and operation of the latches and clutch.

SELECTION OF MODE OF OPERATION

With the invention disclosed, only two basic wiring diagrams are required for almost all applications.

Figure 4:
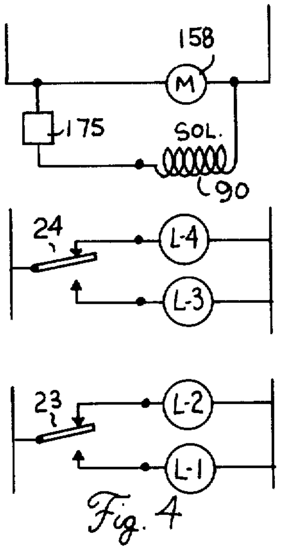
FIG. 4 is a schematic wiring diagram used when the external control circuit is sustained.

Referring to FIG. 4 it will be noted switches 23 and 24 can be in completely isolated circuits, switch 23 controlling loads L1 and L2 while switch 24 controls loads L3 and L4. The motor 158 is wired across a suitable power source. The solenoid 90 is also wired across this power source in series with a control switch 175.

In applications utilizing the on-delay setting of the clutch mode selector switch 175 must remain closed during the time cycle. Conversely in applications utilizing the off-delay clutch setting, switch 175 must be open during the timing cycle. In applications where the clutch mode selector is set in the neutral position, switch 175 can be either open or closed during the cycle.

The switch mode selectors may be set as needed for the requirements for the application. For example both switches may be set to transfer to timing on make of the control circuit. Alternatively both switches may be set to transfer on break fo the control circuit. Also it is feasible to set one switch to transfer on make of the control circuit and the other switch to transfer on break. In this case one switch would operate on interval timing and the other switch would operate on delay timing.

All combinations of the various modes of clutch control and switch control are usable for satisfying various control system requirements. There are only two limitations which must be observed. One is where the clutch must be of the on-delay type. Here the control circuit must be such as to maintain the solenoid energized during the time cycle. The other limitation is where the clutch control must be of the off-delay type.

Here the control circuit must be arranged to maintain the solenoid deenergized during the time cycle.

APPLICATION TO SPECIFIC REQUIREMENTS

In applying the timer to a specific set of requirements, it is first necessary to determine the mode of clutch operation. If the application requires that the timer return to starting position on a power failure, the clutch must be set to its on-delay setting. If the requirements call for the timer to reset in response to making of the control circuit the timer must be set to its off-delay setting. If it is necessary or allowable that the timer maintain its position during a cycle regardless of power failure, the clutch may be set to its neutral mode of operation. With the invention disclosed it is not necessary to resort to off-delay timing to avoid reset on power failure. This mode of operation may be used. However the use of the neutral clutch mode of operation is more flexible as the external control switch may be either of the momentary or sustained type. Also this control switch can be used for transferring to timing by either making or breaking.

The next step in applying a timer is to determine when the main switch should transfer to timing. If this should occur from making of the control circuit, the main switch mode selector is set at M. If transfer to timing should start in response to a break in the control circuit, the mode selector is set at B.

In multiple load applications, the mode selector for the auxiliary switch is set at M if the switch should transfer to timing on make of control circuit and at B if the switch should transfer to timing on break of control circuit. In applications where the additional load is not to be timed but to be controlled directly by the external control switch, the mode selector is set at instantaneous.

As mentioned above all combinations of the various mode selector positions can be used as long as the control circuit maintains the clutch engaged during the required time cycle. A few specific examples of mode selector settings will now be described.

ON DELAY TIMING — BOTH LOADS CONTROL CIRCUIT MAINTAINED ON

For this type of timing both switch mode selectors are set at the B settings. The clutch mode selector is set at its on-delay setting ON. The wiring diagram of FIG. 4 is used.

In this illustration the timer switches 23 and 24 are shown in their timed-out positions which is maintained by the control switch 175 being closed to energized the solenoid at this time. As the timer is in its timed-out position, the timer clutch is disengaged and the timer is reset to its starting position.

When the control switch 175 is opened, the solenoid drops out which releases the switch latches returning the switches to their timing positions energizing loads L1 and L3. The timer does not start a timing cycle at this time due to the solenoid 90 now being deenergized which maintains the clutch disengaged.

To start a time cycle, the control switch 175 is closed energizing the solenoid 90 permitting the clutch to engage and drive the timing mechanism. At the end of the selected time the timer switches 23 and 24 shift back to the timed-out positions shown, energizing loads L2 and L4. This same action causes the timer to reset.

If a power failure should occur during the timing cycle, the solenoid 90 will drop out releasing the clutch and causing the timing mechanism to reset to the starting position.

This type of timing is known as "delay timing" because nothing happens until a period of time after the start of the time cycle. Operation of the timer switches is delayed until the time cycle has expired.

OFF DELAY TIMING — BOTH LOADS CONTROL CIRCUIT MAINTAINED OFF

For this type of timing the switch mode selectors are both set to their shift on make positions M. The clutch mode selector is set at its off delay OFF position. The wiring diagram of FIG. 4 is used. The action of the timer remains the same as for on-delay except that the action of the control switch 175 is now reversed.

With the switches in the positions shown in the wiring diagram of FIG. 4, the timer is in the timed-out position and is maintained in this position by the solenoid 90 being deenergized due to the control switch 175 being open. The timing mechanism has reset due to the timer being in timed-out position.

When the control switch 175 is closed, solenoid 90 is energized which releases the timer latches causing the switches to transfer back to timing position energizing loads L1 and L3. The timing cycle does not start at this time due to the solenoid 90 being energized which maintains the clutch disengaged.

When control switch 175 is opened, the solenoid 90 drops out permitting the clutch to engage which starts a timing cycle. After the time delay has expired switches 23 and 24 return to the timed-out positions as shown energizing loads L2 and L4. The timing mechanism resets ready for the next cycle and the switches remain in the positions shown as long as the control switch 175 is open. When switch 175 is reclosed the timer switches transfer back to energize loads L1 and L3 and the timer is ready for a new cycle when a control switch 175 is once again opened.

INTERVAL TIMING — BOTH LOADS

For interval timing in which the cycle is to start by making of the control circuit both switch mode selectors are set at their shift on make positions (M). If the timer is to reset on power failure, the clutch mode selector is set at its on-delay ON position. If reset on power failure is not desired or required the clutch mode selector is set at its neutral N position.

FIG. 4 for this mode of operation shows the timer in its timed-out position with the solenoid being deenergized due to switch 145 being open. When the control switch 145 is closed to start a time cycle, the solenoid 70 becomes energized which releases the timer latches causing the switches to transfer to timing position. The timer now runs through its time cycle and transfers the switches back to timed-out position at the end of the predetermined period.

This type of timing is known as interval timing as the timer switches shift at the beginning of the timing cycle and shift back again to timed-out at the end of the timed interval.

If the clutch mode selector is in the neutral position it is immaterial whether the closure of switch 175 is momentary or sustained. The timer will return to its timed-out position regardless of the position of the solenoid. However, if the clutch mode selector is set to its on-delay position, the control switch 175 must be maintained closed during the cycle. Otherwise the solenoid will drop out releasing the timer clutch and resetting the timing mechanism.

In the preceding description interval timing is achieved by closure of the control switch.

It will be apparent that the operation of the control switch may be reversed by setting the switch mode selectors at their B settings. Assuming the clutch mode selector is in its neutral position a time cycle will be started anytime the control switch 175 is opened and it is immaterial whether the opening is momentary or sustained. If the opening is to be sustained and reset during the cycle is desired by closure of the control of the control switch, then the clutch mode selector is set at its off-delay position.

COMBINATION DELAY AND INTERVAL TIMING

If the requirements call for the timer to be controlled as for delay timing while providing interval type timing for one load, the main switch mode selector is set at B, the auxiliary switch mode selector is set at M, and the clutch mode selector is set at ON. With this arrangement the main switch will be controlled as previously described under ON DELAY TIMING. However the auxiliary switch will remain in its timed-out position until the control switch is reclosed, energizing the timer solenoid. This action will release the latch of the auxiliary switch and shift the switch to timing position. At the end of the timed interval the auxiliary switch will shift to its timed-out position simultaneously with the main switch. Thus the main switch provides delay type timing while the auxiliary switch provides interval timing from the same control circuit.

If it is desired to control the timer as an interval timer and have delay type timing on one switch, the main switch is set at its M setting and the auxiliary switch is set at its B setting. The clutch mode selector may be set either in its neutral position or in its on-delay position depending on whether or not power failure reset is required.

With this setting of the mode selectors the timer including the main switch will operate as described under INTERVAL TIMING above. However the auxiliary switch will function to provide delay timing. Thus at the end of the time cycle the auxiliary switch will remain in its timed-out position only as long as the control switch 175 remains closed. When this switch opens the auxiliary switch returns back to timing position. Thus when a new interval timer cycle is started for the main switch, the auxiliary switch remains in its initial position and does not shift to timed-out until after the time delay has expired.

The modes of operation above described are with reference to the timing cycle being initiated by closure of the control circuit. It will be apparent that the same type of timing operations can be initiated by opening of the control circuit. This is achieved simply by reversing the positions of the mode selectors from the positions described above.

INTERVAL TIMING — POWER FAILURE RESET MOMENTARY MAKE OF CONTROL CIRCUIT

When these requirements are encountered, it is necessary to maintain the solenoid energized by means independent of the momentary starting switch. In this application the switch mode selectors are set in the M positions and the clutch mode selector is set for on-delay which causes the clutch to be released at the time the solenoid drops out.

Figure 5:
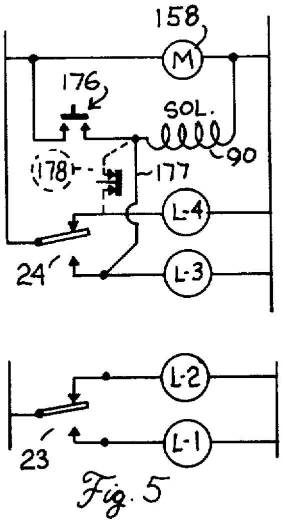
FIG. 5 is a modified schematic wiring diagram used for momentary contact applications.

The wiring diagram of FIG. 5 is used which includes a momentary starting switch 176 for energizing the solenoid and a jumper 177 between the timing contact of auxiliary switch 24 and the solenoid.

In operation closure of the switch 176 energizes the solenoid which transfers the timer switches from timed-out to timing. This motion of the auxiliary switch 24 maintains the solenoid energized after the momentary switch 176 is released. The timer now runs through its time cycle and transfers the switches 23 and 24 back to timed-out position at the end of the timing period. The auxiliary switch 24 in moving toward timed-out position breaks the holding circuit for the solenoid which drops out, conditioning the timer for starting a new cycle when momentary switch 176 is again closed.

ON DELAY TIMING — POWER FAILURE RESET MOMENTARY MAKE OF CONTROL CIRCUIT

For this type of operation the mode selector for the main switch is set in its B position. The mode selector for the auxiliary switch 24 is set at the instantaneous (I) position. The clutch mode selector is set for on-delay operation causing the timer to reset anytime the solenoid is deenergized.

The same basic wiring diagram of FIG. 5 is used except that the jumper 177 is omitted and replaced by the jumper 178 (shown dotted) and which includes an off switch.

When the auxiliary switch is in its instantaneous mode, it energizes load L3 when the solenoid is deenergized and energizes load L4 when the solenoid is energized.

FIG. 5 including the jumper 178 shows the positions of the switches after the timer has timed out and before any external control action has taken place. Thus switches 23 and 24 are in timed-out positions energizing loads L2 and L4. This condition of the auxiliary switch 24 maintains the solenoid energized through the jumper 178 including the stop switch. When the stop switch is depressed it drops out the solenoid. This releases the latch for the main switch 23 and this switch shifts to its timing position energizing load L1. This same deenergization of the solenoid acts through the instantaneous set mechanism for auxiliary switch 24 to shift this switch breaking the circuit to load L4 and also the holding circuit 178 for the solenoid.

To start a cycle, the momentary start switch 176 is depressed which energizes the solenoid and engages the clutch. The timer now runs through its delay cycle and transfers the main switch back to timed out position in which load L1 is deenergized and load L2 is energized. Due to the timer being in its timed-out position the clutch is disengaged even though the solenoid remains energized.

The timer will remain in this condition until the stop switch in jumper 178 is depressed. This deenergizes the solenoid which on dropping out transfers main switch 23 back to timing position energizing load L1 and transfers the instantaneous switch 24 to deenergize load L4 and break the holding circuit through jumper 178. As the solenoid is now deenergized, the timer clutch is disengaged and a new timing cycle will not start until the starting switch 176 is again depressed.

SUMMARY

From the foregoing description it will be apparent that the invention disclosed provides for field conversion of the modes of operation of the timer clutch and the timer switches. Many combinations of these modes are available and the selection of different combinations makes the timer usable for many different control applications. In addition, the proper selection of modes serves to simplify circuitry as the selection of the proper mode does mechanically what was heretofor required to be performed electrically by separate and additional components. It will be further apparent that the provision of field selectable modes in effect provides many different timer models in a single package thus simplifying inventory maintenance.

It will also be apparent that the invention provides a new arrangement of automatic reset timer construction. The load switches are at the back of the timer and are directly attached to the timer terminals thus eliminating wiring between the switches and terminals. The mode selectors are also at the back of the timer where they are accessible, these selectors being in the selector area which is generally surrounded by the terminal area. The timer mechanism for operating the switches is also at the back of the timer adjacent the switches which they operate, these switches being spaced around the center of the timer mechanism. In addition the timer, switch controllers, and the clutch controller are arranged about the center of the mechanism and the solenoid operated mechanism is arranged to operate these mechanisms independently. It will also be apparent that the timer motor is at the front of the timer adjacent the dial so that the motor speed and dial can be matched in the last steps of final assembly.

As many modifications can be made from the preferred form of the invention disclosed herein without departing from the spirit and scope of the invention it is desired to be limited only by the scope of the appended claims.

I claim:

1. In a control device, drive member means having operating abutment means, means for actuating the drive member means and arranged for selectively moving the abutment means through either a first operating range or a second operating range, a driven member arranged to be actuated by engagement and disengagement with the abutment means, and adjustable selective means associated with the driven member for selecting when the driven member responds to movement of the drive member means, said selective means being constructed and arranged to shift at least a portion of the driven member relative to said first and second operating ranges, said selective means including means for maintaining same in a plurality of adjusted positions.

2. The combination set forth in claim 1 in which the driven member is a lever having a pivot, and in which the selective means bodily shifts said pivot.

3. The combination set forth in claim 1 in which the drive member means consists of a wheel, and the abutment means consists of a plurality of separate spaced abutments mounted on said wheel.

4. The combination set forth in claim 1 in which the selective means is arranged to cause actuation of the driven member by either one or the other of said operating ranges, or a combination of both.

5. The combination set forth in claim 2 in which the drive member means consists of a wheel and the abutment means consists of a plurality of separate spaced abutments mounted on said wheel.

6. The combination set forth in claim 3 in which the means for actuating the wheel includes a reciprocating element and ratchet means arranged to move the wheel through the first operating range of the abutment means when the reciprocating element moves in one direction, and to move the wheel through said second operating range of the abutment means when the reciprocating element moves in the opposite direction.

7. The combination recited in claim 6 in which the driven member and abutment means are located on one side of the wheel and the reciprocating element is located on the opposite side thereof.

8. In a control device, a controller movable between first and second controlling positions, a lever arranged to actuate said controller, said lever having a normally stationary but bodily adjustable pivot and arranged to remain in actuating relationship with the controller in a plurality of positions of said pivot holding means for holding the pivot stationary in said plurality of positions, drive member means having operating abutment means arranged for actuating said lever about its pivot, means for actuating the drive member means and arranged for selectively moving the abutment means through either a first operating range or a second operating range, said adjustable pivot for the lever being arranged to carry the lever and shift it bodily relative to the first and second operating ranges thereby determining how the controller responds to movement of the drive member means.

9. The combination set forth in claim 8 in which the drive member means consists of a wheel and the abutment means consists of a plurality of separate spaced abutments mounted on said wheel.

10. The combination set forth in claim 9 in which the means for actuating the wheel includes a reciprocating element and ratchet means arranged to move the wheel through the first operating range of the abutment means when the reciprocating element moves in one direction, and to move the wheel through said second operating range of the abutment means when the reciprocating element moves in the opposite direction.

11. In a timing device, a controller having a first position and a second position, means including timing means for causing movement of the controller from its first position to its second position, return means for causing movement of the controller from its second position when the return means is actuated, means for actuating said return means, said actuating means including drive member means arranged for selective movement in either a first operating range or a second operating range, and selective means associated with the return means for selecting how the return means responds to movement of the drive member means, said selective means being constructed and arranged to shift at least a portion of the return means relative to said first and second operating ranges.

12. The combination recited in claim 11 in which the return means includes a lever having a pivot and in which the selective means bodily shifts the pivot.

13. The combination recited in claim 12 in which the pivot for the lever consists of a pin, a rotatable adjusting member, said pin being eccentrically mounted on said rotatable adjusting member, whereby rotation of the adjusting member bodily shifts said pivot.

14. The combination recited in claim 11 in which the drive member means consists of a wheel having a plurality of spaced abutment means arranged to acutate the return means.

15. The combination recited in claim 14 in which abutment means on the wheel are arranged to both engage and release the return means as the wheel rotates through a selected operating range, thereby allowing the controller to be moved to its second position and maintained therein without additional movement of said wheel.

16. The combination set forth in claim 14 in which the means for actuating the wheel includes a reciprocating element and ratchet means arranged to move the wheel through the first operating range of the abutment means when the reciprocating element moves in one direction, and to move the wheel through said second operating range of the abutment means when the reciprocating element moves in the opposite direction.

17. In a timing device, a controller having a first position and a second position, means including timing means for causing movement of the controller from its first position to its second position, return means for causing movement of the controller from its second position when the return means is actuated, means for actuating said return means, said actuating means including a wheel having a plurality of abutments arranged to contact and actuate the return means as the wheel rotates, and means for rotating the wheel step by step.

18. The combination set forth in claim 17 in which an abutment on the wheel is arranged to both engage and release the return means as the wheel is rotated through one of its steps.

19. In an automatic reset timing device, the combination of, a controller having a first position and a second position, means including a motor and spring return timing means driven thereby for causing movement of the controller from its first position to its second position at the end of a period of time, clutch means interposed between said motor and timing means for disengaging the motor from the timing means to allow the timing means to reset when the clutch means is disengaged, latch means having a latching position in which it holds the controller in its second position and a released position allowing the controller to return to its first position, said latch means being arranged to move from released position to latching position when the controller is actuated to its second position by the timing means, means for releasing the clutch means when the controller is in said second position, and means for delaying reset of the timing means by disengagement of the clutch means while the latch means moves into latching position.

20. The combination recited in claim 19 in which the timing means includes a drive member driven by the motor and a driven member driven by the drive member and actuating the controller, the delaying means being arranged to retard return movement of the driven member.

21. The combination recited in claim 19 in which the delaying means consists of a latch which is released after the latch means is in latching position.

22. The combination recited in claim 19 in which the delaying means consists of a latch which is released as a function of the movement of the controller.

23. In an automatic reset timing device, the combination of, a control device having an operator, a main bearing axis, cam means rotatably mounted on said axis for actuating said control device from one position to another, a latch pivoted at a point spaced from said axis for restraining motion of said cam means, a spring winder rotatably mounted on said axis adjacent said cam means, a spring having one part actuated by the winder and another part arranged to actuate the cam means, a spring return timing element mounted on said axis adjacent the spring winder, means actuated by the timing element upon approaching a predetermined position for moving said spring winder to load said spring, and means actuated when the timing element reaches said predetermined position for releasing said latch.

* * * * *